Patented June 25, 1935

2,005,774

UNITED STATES PATENT OFFICE 2,005,774

PRODUCTION OF BENZOIC ACID AND BENZOATES

Jules Emile Demant, Cuise Lamotte, France, assignor to Bozel-Malétra Société Industrielle de Produits Chimiques, Cuise Lamotte, France, a corporation of France No Drawing. Application August 31, 1932, Serial No. 631,125. In Germany June 23, 1932

12 Claims. (Cl. 260—108)

The invention relates to a process for the production of benzoic acid and benzoates by the oxidation of toluene with the aid of chromates at temperatures above 100° C., for example 150–300° C. and under the application of pressure, in which the chromic hydroxide formed is separated from the aqueous reaction liquid and the benzoate caused to separate as such or as free acid.

It has been found, according to the present invention, that, for the oxidation of the toluene, crude salts of chromic acid may be employed, particularly chromate frits, such as are obtained by the alkaline decomposition of chromium alloys, for example ferrochrome, chrome ores and other chromium-containing substances. An advantageous procedure is, for example, to employ aqueous extracts of the aforesaid chromate frits for the oxidation of the toluene and in this way to cause, for example, crude aqueous neutral chromate solutions to react upon toluene at temperatures above 100° C., under pressure, and, after separating the residue, to work up the resulting aqueous benzoate solution to benzoate or benzoic acid in known manner.

It is also possible to add to the crude chromate a quantity of acid sufficient for conversion to bichromate and to treat the toluene, for example at 200–300° C. or higher, with the resulting crude bichromate solution which contains all the impurities.

The reaction takes place according to either or both of the following equations:

$$C_6H_5CH_3 + 2Na_2CrO_4 = C_6H_5COONa + Cr_2O_3 + 3NaOH$$

$$C_6H_5CH_3 + Na_2Cr_2O_7 = C_6H_5COONa + Cr_2O_3 + NaOH + H_2O$$

The chromate frits prepared according to the usual processes are, as is known, more or less impure. Even an aqueous extract of the same contains, besides alkali chromate, all the decomposed impurities soluble in water, such as calcium and magnesium as chromate, aluminate and silicate and excess of alkali, etc., foreign substances which render for example the separation of the pure monochromate extraordinarily difficult. It has been surprisingly found, according to this invention, that the foreign substances contained in the chromate frits in no way disturb the oxidation of the toluene but can be directly employed without the slightest detriment to the success of the process.

The process according to the invention is accompanied by very considerable advantages, since all the purifying, crystallizing and other treatments, together with the costs incurred thereby, are dispensed with. After the completion of the oxidation, all the chromium occurs as trivalent chromium in the form of chromic hydroxide, whilst the benzoic acid has gone into solution as benzoate. In addition, the aqueous solution contains, for example, free caustic alkali, which has been formed from the chromate introduced.

If, after filtering off the solid residue, the aqueous solution is concentrated, the benzoate is quantitatively precipitated and there remains, for example, a practically pure caustic alkali lye, which may with advantage be further worked up to pure caustic soda or be used for other purposes. The benzoate may be converted by recrystallization into a marketable product or into pure benzoic acid by precipitation with acids.

It is worthy of note that all impurities remain behind in the chromic hydroxide residue.

If it is desired to recover the oxidizing agent, the residue is treated, for example, with caustic alkali, or better still with alkali carbonate, and the mixture treated in a stirring autoclave at 150–300° C. with oxygen, air or other oxygen-containing gases. After the completion of the oxidation, depending on the quantities of alkali employed, all the trivalent chromium is obtained in the form of absolutely pure monochromate or bichromate according to the reactions:

$$Cr_2O_3 + 2Na_2CO_3 + 3O = 2Na_2CrO_4 + 2CO_2$$
$$Cr_2O_3 + Na_2CO_3 + 3O = Na_2Cr_2O_7 + CO_2$$

All impurities such as lime, magnesia and alumina remain behind as insoluble residue.

It will be apparent that the process of the present invention is suitable not only for the production of pure benzoic acid in good yield, but that it is also attended with the important advantage that the oxidizing agent can be employed in a crude condition and the latter be recovered in an absolutely pure state by regeneration, so that a costless purification process for the oxidizing agent is simultaneously provided by the actual oxidizing process.

It has also been found possible in order to regenerate the oxidizing agent to treat the chromic hydroxide-containing residue oxidizingly in the presence of crude chromate, if desired an aqueous extract of the chromate frit, whereby bichromate in a state of great purity is obtained according to the equation:

$$Cr_2O_3 + 2Na_2CrO_4 + 3O = 2Na_2Cr_2O_7$$

In order to remove, for example, free lime or magnesia, it is in this case advisable to operate in the presence of a little carbon dioxide, or, alternatively, to add to the monochromate solution a quantity of alkali carbonate corresponding to the lime or magnesia, whereby these impurities are converted into the corresponding carbonates which are neutral in behaviour towards bichromate.

Further researches have shown that the speed of reaction of the toluene oxidation is lowered by the alkaline reacting products formed thereby, for example the caustic alkali produced when employing alkali chromates.

It has been found possible to remedy this disadvantage by neutralizing the alkaline reacting substances, for example the caustic alkali formed, in their nascent state. Carbon dioxide, bicarbonate of an alkali metal, salts of magnesium or aluminium, for example the sulphates of these metals, salts of the heavy metals and the like have proved to be very advantageous for this purpose. If the operation is effected, for example, in the presence of carbon dioxide, the free alkali formed is converted into carbonate or even bicarbonate. Chromates or bichromates, such as those of the alkaline earths, the bases of which are practically insoluble or with difficulty soluble in water, or have a lower alkalinity than the bases of the alkaline metals, may also be employed for the oxidation. Magnesium chromate or bichromate which is converted during the process into chromic hydroxide and insoluble magnesia, have proved to be admirably adapted for the aforesaid purpose.

Examples 1. 100 parts of pure toluene are treated with an aqueous extract of a sodium chromate frit which has been obtained in known manner by the alkaline oxidizing decomposition of chromium ore and heated to 250–350° C. in a stirring autoclave. The chromium content of the crude monochromate solution is adjusted to about 2 atoms of chromium per molecule of toluene. After completion of the oxidation the mass is allowed to cool to about 100° C. and the unused toluene expelled by distillation. The reaction material is filtered and the alkaline sodium benzoate-containing solution separated from the solid residue, comprising the chromic hydroxide and impurities. On concentrating the alkaline benzoate solution, sodium benzoate is quantitatively precipitated and an about 20–30% caustic soda lye remains behind, which may be worked up in known manner to a commercial article or be used for other purposes.

By recrystallizing the crude benzoate, commercial sodium benzoate is obtained. An alternative procedure, however, is to dissolve the precipitated crude benzoate in water and to precipitate the free benzoic acid with mineral acid, which is directly obtained in a pure condition having the correct melting point.

The oxidizing process takes place according to the following equation:

$$C_6H_5CH_3 + 2Na_2CrO_4 = C_6H_5COONa + Cr_2O_3 + 3NaOH$$

If it is desired to regenerate the oxidizing agent and in this way to complete the cycle, an equivalent quantity of caustic alkali or, better still, sodium carbonate solution, is added to the chromic oxide-containing residue and the mass treated at 150–300° C. with oxygen or air in a stirring autoclave.

All the trivalent chromium is converted into pure sodium monochromate, while all the impurities such as lime, magnesia and alumina remain unattacked and, on filtering, remain behind on the filter as an insoluble residue.

2. 100 parts of pure toluene are treated with an impure bichromate solution obtained, for example, by neutralizing a chromate frit extract with sulphuric acid or the like and heating for some time to 250–350° C. with thorough stirring in an autoclave.

The bichromate solution is so adjusted that it contains 2 atoms of chromium per molecule of toluene. The oxidation of the toluene to sodium benzoate takes place according to the equation:

$$C_6H_5CH_3 + Na_2Cr_2O_7 = C_6H_5COONa + Cr_2O_3 + NaOH + H_2O$$

The further treatment of the reaction product, as well as the regeneration of the oxidizing agent, in the course of which the impurities remain behind in the chromium oxide-containing residue, is effected as described in Example 1. It is advisable, and also more economical, to effect the regeneration of the bichromate with the aid of alkali carbonate, whereby the impurities are precipitated as insoluble carbonates of calcium and magnesium, neutral to bichromate, as well as the alumina. The resulting bichromate solution is absolutely pure and can with advantage be worked up to a pure commercial article.

3. 100 parts of pure toluene are treated as described in Example 1 or 2 with a crude monochromate or bichromate solution and heated at 250–350° C. for some time in a stirring autoclave in the presence of carbon dioxide, and otherwise further treated as in Example 1 or 2. The purpose of operating in the presence of carbon dioxide is to fix the liberated caustic alkali with carbon dioxide in the form of carbonate or bicarbonate. By this procedure the speed of reaction is very considerably increased. In this case there is obtained, as well as the chromic oxide-containing residue, an aqueous solution of sodium benzoate and alkali carbonate or bicarbonate in place of caustic alkali.

4. Toluene is treated as described in Examples 1 and 2 with the provision, however, that magnesium sulphate, aluminum sulphate, or a water soluble salt of a heavy metal is added in a quantity corresponding to the liberated alkali. The liberated alkali is neutralized as soon as it is formed, whilst the added substances are precipitated in the form of their insoluble oxides or hydrates. If the oxidizing agent is regenerated as described above, these oxides remain behind as insoluble residues.

5. Toluene is treated with a crude solution of magnesium chromate or bichromate and further worked up in a manner similar to that described in Example 1 or 2.

What I claim is:

1. A process for the production of benzoic acid and benzoates by the oxidation of toluene with impure salts of chromic acid, which contain the impurities originating from the chromiferous raw materials, in the presence of water at temperatures above 100° C. and under superatmospheric pressure.

2. A process as claimed in claim 1, wherein the impure chromates are chromate frits.

3. A process as claimed in claim 1, wherein the impure chromates are chromate frits, obtained in a manner known per se by the alkaline oxidizing decomposition of chromium ores.

4. A process as claimed in claim 1, wherein the impure chromates are chromate frits, obtained in a manner known per se by the alkaline oxidizing decomposition of chromium alloys.

5. A process for the production of benzoic acid and benzoates by the oxidation of toluene with chromates in the presence of water at temperatures above 100° C. and under superatmospheric pressure, by means of aqueous extracts of chromate frits, which have been obtained in a manner known per se by the alkaline decomposition of chromium-containing substances.

6. A process for the production of benzoic acid and benzoates by the oxidation of toluene with chromates in the presence of water at temperatures above 100° C. and under superatmospheric pressure, by means of impure bichromates which have been obtained from impure salts of chromic acid, which contain the impurities originating from the chromiferous raw materials, by conversion in a manner known per se.

7. In a process for the production of benzoic acid and benzoates by the oxidation of toluene with chromates in the presence of water at temperatures above 100° C. and under superatmospheric pressure, the step of neutralizing the alkaline-reacting products formed during the oxidation of the toluene.

8. A process according to claim 7, wherein the alkaline-reacting products formed during the oxidation of toluene are neutralized by the addition of substances selected from the group consisting of carbon dioxide, bicarbonate of an alkali metal, the water-soluble salts of magnesium, aluminium and the heavy metals.

9. A process according to claim 7, wherein the chromates are impure alkaline earth salts of chromic acid, which contain the impurities originating from the chromiferous raw material.

10. A process according to claim 7, wherein impure magnesium salts of chromic acid are used, which contain the impurities originating from the chromiferous raw material.

11. A process for the production of benzoic acid and benzoates by the oxidation of toluene, comprising effecting the oxidation with impure salts of chromic acid, which contain the impurities originating from the chromiferous raw material, in the presence of water at temperatures above 100° C. and under superatmospheric pressure, separating the residues of the toluene oxidation process from soluble substances, subjecting said residues in a manner known per se in aqueous phase to pressure oxidation and separating the solutions of the salts of the chromic acid so obtained from the residues containing the impurities.

12. A process as set forth in claim 11, wherein the reaction products of the additions employed for neutralizing the alkaline-reacting substances formed during the oxidation of toluene are separated together with the residues of the regeneration process containing the impurities of the impure salts of chromic acid from the chromate solutions obtained.

JULES EMILE DEMANT.